May 13, 1941.     T. ZUSCHLAG     2,241,874
METHOD FOR GEOPHYSICAL EXPLORATION
Filed Feb. 24, 1939
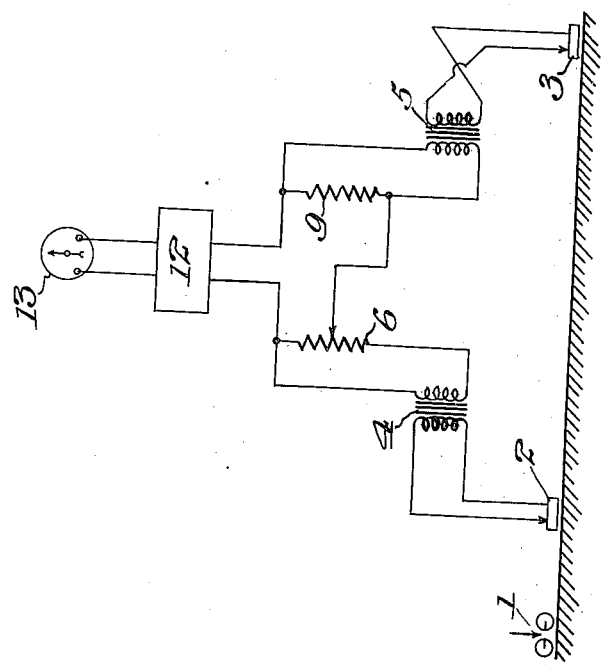
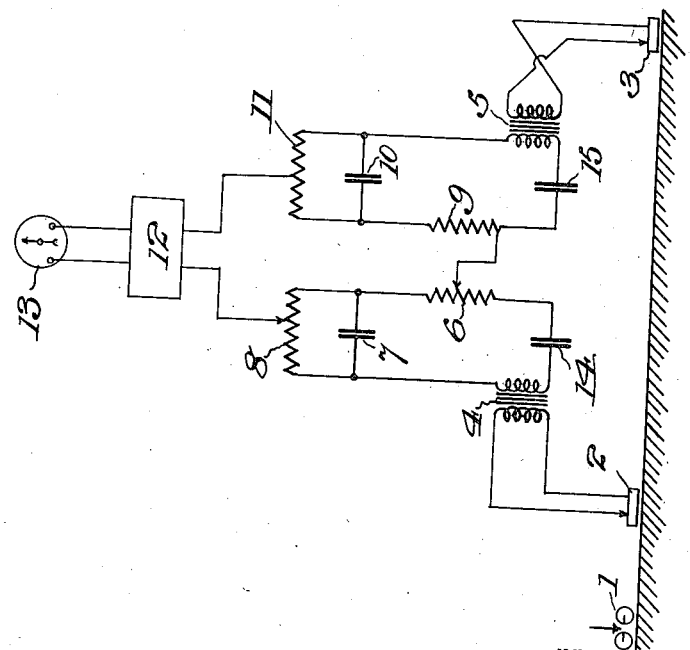
INVENTOR
Theodor Zuschlag
BY
his ATTORNEYS Patented May 13, 1941

2,241,874

UNITED STATES PATENT OFFICE 2,241,874

METHOD FOR GEOPHYSICAL EXPLORATION

Theodor Zuschlag, West Englewood, N. J., assignor, by mesne assignments, to Lundberg Exploration S. A., Panama City, Panama, a corporation of Panama Application February 24, 1939, Serial No. 258,144

4 Claims. (Cl. 181—0.5)

This invention relates to a method for geophysical exploration, and has for an object to provide for a systemtaic investigation of the distribution of vibratory waves artificially created in the surface and sub-surface of the ground.

Another object is to provide an apparatus which is extremely simple in construction and easily handled, while being accurate and efficient in operation.

Another object is to provide a method that produces informative and accurate results with a small number of steps or operations that are susceptible of ready accomplishment by one skilled in this art.

Another object is to provide a method for determining the speed of propagation of the vibratory waves by either measuring the apparent wave length of vibrations of constant frequency or by determining the frequency necessary to set up an arbitrarily fixed wave length.

A further object consists in providing certain improvements in the form, construction and arrangement of the parts, and in the steps followed, whereby the above named and other objects may effectively be obtained.

This application is a continuation in part of my application, Serial No. 170,227, filed October 21, 1937, now Patent No. 2,202,885, granted June 4, 1940.

In the art of geophysical exploration that is followed mainly for predetermining the location and character of substances lying beneath the surface of the ground, it is a well known fact that the distribution of waves, artificially created in the ground by a suitable mechanical oscillator, is affected by variations in the speed of propagation or travel of such waves within or through the different media in the ground through which they pass. This speed of propagation of the waves depends upon the coefficient of elasticity of the various ground media, and thus it may serve as a criterion enabling the detection of the presence of media of varying elasticity, which detection is accomplished by noting the deviations the speed of propagation causes within a mechanical wave pattern or outline created by a source of artificial vibrations.

Previously it has been customary to investigate such wave patterns by means of oscillographic records together with appropriate sounding devices. In devising the present invention, it has been my endeavor to simplify the method and apparatus used to obtain the desired results and, to that end, I have developed simple compensating and indicating apparatus that enables the investigation of such vibratory wave patterns in a manner analogous to that followed in the art of electrical prospecting.

According to my invention the desired information as to the character of the ground media is obtained by investigating the phase and amplitude relationship of the mechanical waves created by a source of vibratory energy; which investigation calls for the presence of a compensator of such design as to make possible a complete compensation of low frequency wave oscillations with a minimum of auxiliary apparatus.

Practical embodiments of apparatus illustrating my invention are shown in the accompanying drawing, in which—

Fig. 1 represents diagrammatically a preferred form for general use according to my method; and Fig. 2 represents diagrammatically a modified form which is substantially simplified and adapted particularly to conditions in which reduction in weight and parts is important.

Referring to Fig. 1, the numeral 1 denotes a suitable mechanical oscillator, preferably of the opposed eccentric or vibrating membrane type driven from an appropriate source of energy. The vibratory waves generated by the oscillator 1 travel through the ground and are collected by a pair of electrically similar pickups of the microphone, crystal, condenser, electro-magnetic coil or other type, which pickups are marked 2 and 3, and are preferably located on a substantially straight line projecting from oscillator 1.

The outputs of pickups 2, 3 are connected to the primaries of two similar matching transformers 4, 5. The secondary of transformer 4 is connected in series with a potentiometer 6 and a phase condenser 7 which latter is shunted by a second potentiometer 8; while the secondary of transformer 5 is connected in series with a fixed resistor 9 and a phase condenser 10 which latter is shunted by a center tapped resistor 11.

The two condensers 7 and 10 are constructed to have similar electrical values, and the same is true with respect to the electric resistances of potentiometer 6 and resistor 9, as also with respect to potentiometer 8 and resistor 11.

The slider of potentiometer 8 and the center of the fixed resistor 11 are connected to the input of an amplifying device 12, the output of which latter is arranged to be measured by means of an indicating meter 13 connected therewith. The electrical circuit of the apparatus is completed by connecting the slider of potentiometer 6 to the end of resistor 9, which latter, as previously stated, is connected to the secondary of transformer 5.

According to one method of operating the apparatus of Fig. 1 just described, the oscillator 1 and pickups 2, 3 are placed upon the ground to be explored in substantially the relationship shown and described, and the oscillator is set in motion. The mechanical waves generated by the oscillator and collected by pickups 2 and 3 are changed into electrical oscillations of the same frequency, which latter create corresponding electrical current flows in the secondary circuits 4, 6, 7 and 5, 9, 10. If it be assumed that the said currents flow in the direction of the arrows leading from transformers 4 and 5, and if it be further assumed that the phase of the said two currents is the same, then it is evident that, by shifting the slider of potentiometer 6, the resulting current flow in the circuit 12, 8, 6, 9, 11 may be brought to zero, provided the slider of potentiometer 8 is positioned at the center thereof. The zero condition can be recognized and established by noting the deflection of the needle on indicating meter 13.

If now, R be regarded as representing the value of resistor 9, and X be regarded as representing the value of the resistance between the slider of potentiometer 6 and the end of said potentiometer which is nearer to condenser 7, then the ratio X/R is proportionate to the ratio of the amplitude of the mechanical waves collected at pickups 2 and 3.

In actual practice it will be found that the above-named assumption as to sameness in phase of the two currents flowing in the output circuits of the transformers 4 and 5, is not likely to be realized. This is due to the fact that the distance from oscillator 1 to pickup 3 is substantially greater than the distance from oscillator 1 to pickup 2 so that, because of its limited speed of travel, a wave generated at oscillator 1 will arrive at pickup 3 later than at pickup 2; and, likewise, the resultant delay in time of arrival at pickup 3 as compared with the time of arrival at pickup 2, causes a corresponding delay in phase of the electric currents induced in circuits 4, 6, 7 and 5, 9, 10.

Phase difference of this type between the said currents will cause a current flow in the indicator input circuit 12, 14, 9, 6, 8, and will correspondingly deflect the needle of indicating meter 13. However, such deflection can be reduced to zero by an appropriate adjustment of the sliders on potentiometers 8 and 6.

If it be assumed in this connection, for purposes of illustration, that the resistance values of potentiometer 8 and resistor 11 are high as compared with the reactances of condensers 7 and 10, then the phase difference between the output currents of transformers 4 and 5, and consequently the delay in the time of arrival of the mechanical waves at pickup 3 as compared with the time of arrival at pickup 2, is proportionate to the value of the resistance between the center point of potentiometer 8 and the final position to which its slider has been moved in eliminating the deflection of meter needle 13 last mentioned.

Under certain circumstances that may be encountered, the performance of the apparatus may be improved by tuning the two circuits 4, 6, 7 and 5, 9, 10 to the frequency of the mechanical waves artificially created at oscillator 1, by the introduction of two similar condensers in series with the said circuits. By proceeding in this way, it is possible to reduce the effect of other mechanical vibrations not related to the waves set up by oscillator 1. Such condensers, suitably located, are denoted by the reference numerals 14, 15.

Continuing, the mechanical wave pattern created by oscillator 1 is investigated in the manner above described by measuring the amplitude ratio and the phase difference between pickups 2 and 3, the determination being made by reading the potentiometers. Pickup 2 is then preferably moved to the location of pickup 3, and the latter is moved to a new location approximately the same distance from its previous location as the original space between pickups 2 and 3, and preferably in the same line. In this new location of the pickups, their amplitude ratio and phase difference are again determined in the same way as before. The pickups may then be moved to other points and the same investigation repeated.

Systematically proceeding in this manner the investigations may be carried out along predetermined lines or profiles which, in turn, can be plotted or charted to reflect the thus measured amplitude ratios and phase differences. By combining the plots of several systematically distributed profiles or lines, preferably arranged in radiating or parallel directions, patterns showing the distribution of equiamplitude and equiphase values may readily be constructed.

As previously mentioned, the form or arrangement of these patterns is based upon the speed of propagation or travel of the mechanical waves within the various media traversed by them. It is well known that the resultant arrangement of these patterns is particularly affected by the reflection and refraction phenomena, which generally take place whenever the speed of travel or propagation changes because of differences in two media. Consideration of these phenomena, therefore, is important when interpreting the results of investigations carried out as above described.

Referring now to the modified form of apparatus shown in Fig. 2, it will be observed that the parts are the same except that the potentiometers 8 and 11, as well as the condensers 7 and 10, are eliminated, and that the amplifying device 12 is in direct connection with the potentiometer 6 and fixed resistor 9.

This form of apparatus is thus simplified through the elimination of certain parts, and is highly desirable particularly for use in connection with difficult terrain conditions where the transportation problem becomes relatively magnified.

This modified form of apparatus shown in Fig. 2 also is adapted for carrying out the investigation by a method which is a modification of that hereinabove described.

In particular reference to this modification in apparatus and method I may point to the well known fact that speed of propagation of the waves, which may be represented by $s$, together with the frequency thereof, which may be represented by $f$, determine the apparent wave length, which may be represented by $l$, of the mechanical waves produced by the oscillator, in accordance with the formula $s = l \times f$. This relationship may be used to determine the speed of propagation, either by measuring the apparent wave length of a constant frequency, or by determining the frequency that is necessary to set up an arbitrary or predetermined wave length.

Generally speaking, the total length of any oscillatory wave is represented by the distance between two successive points of equal phase; and the half length of such wave is represented by the distance between two successive points of opposite phase. These relationships may be employed to determine the numerical value of the speed of propagation as follows:

The oscillator 1 is set in operation to generate waves at a constant frequency, and the pickups 2 and 3 are located side by side close to the oscillator. Pickup 3 is then moved out a short distance beyond pickup 2, preferably along a straight line or profile radiating from the oscillator 1. The operator then attempts to obtain amplitude compensation by adjusting the slider of potentiometer 6 until a minimum reading of the galvanometer 13 is obtained. If it is discovered that the indicator on the meter 13 cannot, by this adjustment, be caused to return to zero, this fact indicates that the phase of the electromotive forces received by the pickups 2 and 3 is neither identical nor opposite, one of which conditions is required for the simple determination of the wave length or the half wave length. Under these circumstances, the operator moves pickup 3 further along the line of the profile, and the amplitude compensation is again attempted in the same way; which procedure is repeated until the pickup 3 reaches a location where it is possible to obtain a zero reading of the meter 13 by adjustment of the slider of potentiometer 6. Then the distance between the location of pickup 2 and the location of pickup 3 which permitted zero adjustment of the meter as just described, will represent either the wave length or the half wave length of the vibrations between the pickups 2 and 3, according to the arrangement of the connections of the said pickups.

In taking the next step, the operator moves pickup 2 to the previously determined location of pickup 3 where zero reading of the meter was obtained, and a new in-phase or opposite phase point of location is determined for pickup 3 as before by experimenting until zero reading of the meter is again obtained.

The procedure just outlined is systematically continued or repeated until the full length of the profile has thus been investigated. By plotting the measured amplitude ratios and the calculated speed of propagation values against successive in-phase or opposite phase locations determined as previously described, the resultant curves may be interpreted as to their geophysical meaning.

As previously noted, the relationship between speed of propagation, frequency, and apparent wave length, may be used to determine the speed of propagation either by measuring the apparent wave length of constant frequency vibrations or by determining the frequency necessary to set up an arbitrary wave length. Therefore, instead of proceeding as just described to determine the apparent wave length resulting from a constant frequency operation of the oscillator 1, the operator may choose to locate the pickups 2 and 3 at two certain pre-selected points with respect to the oscillator, and then adjust the frequency of the oscillator until an in-phase or opposite phase condition has been established with respect to the two arbitrarily selected points of location of the pickups, which condition is determined, as heretofore described, by zero reading of the galvanometer. By systematically repeating this procedure with respect to successively selected arbitrary locations of the pickups, the results may again be plotted as to amplitude ratio and apparent speed of propagation, and the result interpreted as to geophysical meaning.

Both of the variations in method just described utilize the determination of amplitude ratio values, and both are also based upon the use of predetermined or fixed phase values. An important advantage arising from this utilization of fixed phase values lies in a practicable substantial simplification in the construction of the apparatus employed, which simplification results in apparatus of very light weight that is a predominant consideration in connection with operations through difficult terrain. The procedure also permits the use of fairly low frequency oscillations which naturally promotes accuracy in method and result.

While, as already explained, the simplified form of apparatus shown in Fig. 2 is wholly adequate for carrying out the two variations in method just described, it should be noted that the apparatus of Fig. 1 may also be employed in the same way by moving the slider of potentiometer 8 to the center point thereof and keeping it there with no further adjustment or, indeed, by short circuiting the two halves of potentiometers 8 and 11 and entirely disconnecting the phase condensers 7 and 10. As thus arranged, the apparatus of Fig. 1 may be handled by the operator as hereinabove set forth in connection with the description of the operation touching the apparatus of Fig. 2.

It will be understood that various changes may be resorted to in the form, construction, arrangement and material of the several parts constituting the apparatus hereinabove described, and in the steps followed in carrying out the method, without departing from the spirit and scope of my invention; hence I do not intend to be limited to the details herein set forth except as they may be included in the claims.

What I claim is:

1. The method of geophysical exploration comprising, creating a continuous mechanical wave pattern, intermittently determining the momentarily effective amplitude ratio and phase difference between two points within said wave pattern by a non-continuous measuring procedure, repeating this procedure with other selected points, plotting the thus determined values, and interpreting the resultant amplitude and phase patterns as to their geophysical meaning.

2. The method of geophysical exploration comprising, creating a continuous mechanical wave pattern, reducing the effect of mechanical waves unrelated to said pattern, intermittently determining the momentarily effective amplitude ratio and phase difference between two points within said wave pattern by a non-continuous measuring procedure, repeating this procedure with other selected points, plotting the thus determined values, and interpreting the resultant amplitude and phase patterns as to their geophysical meaning.

3. The method of geophysical exploration comprising, creating a continuous mechanical wave pattern, intermittently determining the momentarily effective amplitude ratio between two successive points within said wave pattern that are either in phase or in opposite phase by a noncontinuous measuring procedure, repeating this procedure with other arbitrarily chosen points, plotting the thus determined values, and interpreting the resultant curves as to their geophysical meaning.

4. The method of geophysical exploration comprising, creating a continuous mechanical wave pattern, intermittently determining the momentarily effective amplitude ratio and the frequency necessary to bring two pre-selected points within said wave pattern into a condition of either in phase or opposite phase by a noncontinuous measuring procedure, repeating this procedure with other pre-selected points, plotting the thus determined values, and interpreting the resultant curves as to their geophysical meaning.

THEODOR ZUSCHLAG.